Nov. 7, 1972  I. J. NIEMKIEWICZ ET AL  3,702,177
ADJUSTABLE ROTARY HYDRAULIC BRAKE
Original Filed June 19, 1969  3 Sheets-Sheet 1

INVENTORS
IGNATIUS JOHN NIEMKIEWICZ
GEORGE H. REINEMUTH
FLOYD G. SILVER
BY
Meyer, Tillery & Body
ATTORNEYS

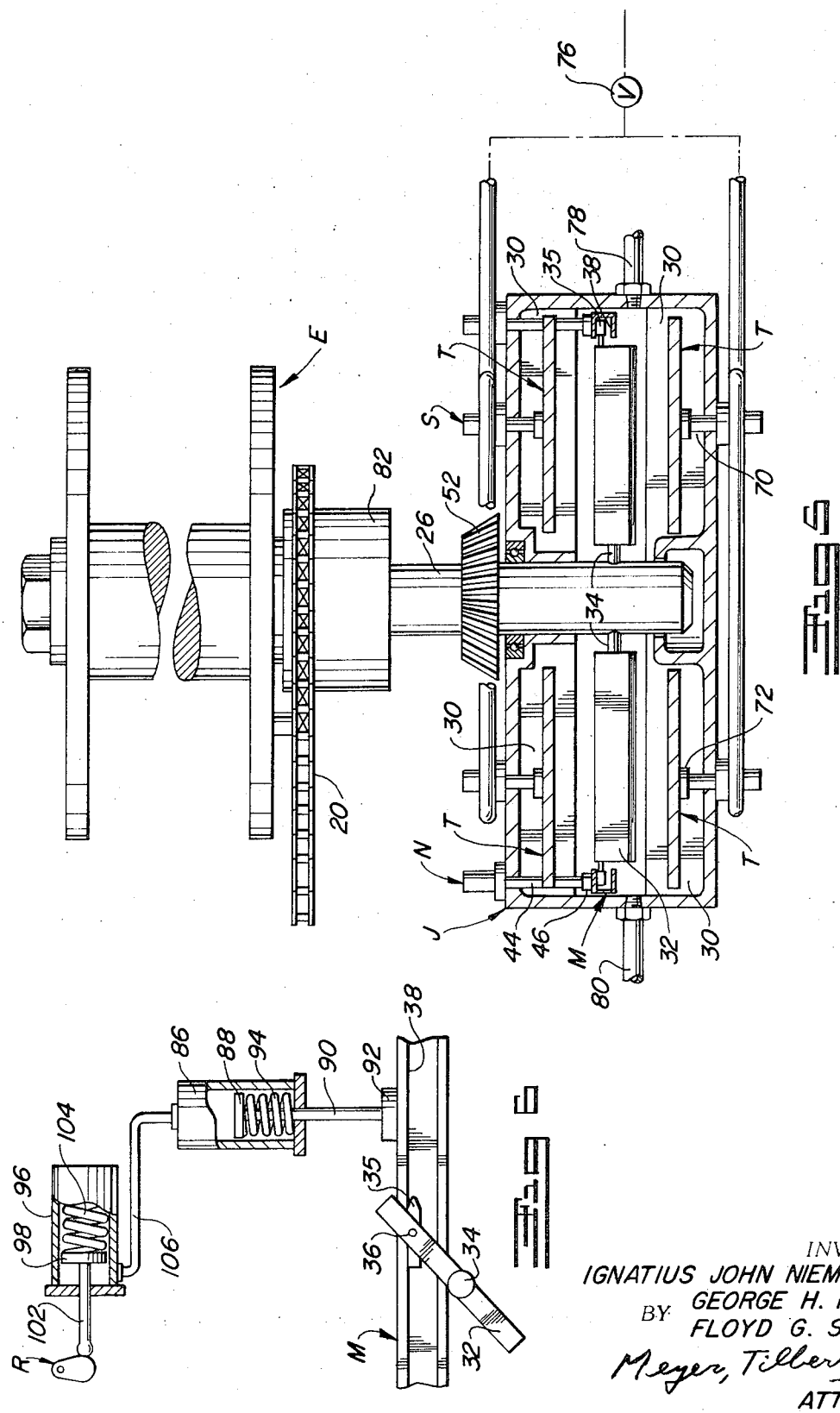

3,702,177
ADJUSTABLE ROTARY HYDRAULIC BRAKE
Ignatius John Niemkiewicz, Wilmington, Del., and George H. Reinemuth and Floyd G. Silver, Secane, Pa., assignors to Gulf + Western Industrial Products Company, Grand Rapids, Mich.
Continuation of abandoned application Ser. No. 834,660, June 19, 1969. This application Mar. 15, 1971, Ser. No. 124,518
Int. Cl. B64f 1/02
U.S. Cl. 244—110 A    4 Claims

ABSTRACT OF THE DISCLOSURE

A rotary hydraulic brake includes a rotor having rotor vanes and a stator having stator pockets. Liquid received in the brake housing is acted upon by the vanes and pockets to provide a braking force. The rotor vanes are rotatably adjustable about radial axes extending radially from the axes of rotation of the rotor. The rotor vanes are automatically rotated about their own axes to increase the braking action with progressive rotation of the rotor.

---

This application is a continuation of application Ser. No. 834,660 filed June 19, 1969, now abandoned.

BACKGROUND OF THE INVENTION

This application pertains to the art of rotary hydraulic brakes and more particularly to a progressively adjustable rotary hydraulic braking device. The invention is particularly applicable to use in aircraft arresting devices and will be described with particular reference thereto although it will be appreciated that the invention has broader applications and may be used for braking other moving loads.

One type of prior art aircraft arresting appartaus includes rotatable reels on which elongated flexible elements are coiled. A landing aircraft engages the flexible elements and causes rotation of the reels as the flexible elements are uncoiled. Energy absorbers connected with the reels retard rotation of the reels so that a retarding force is applied to the aircraft. It is desirable to retard rotation of the reels in such a manner that the deceleration rate of the aircraft is substantially constant. With such an arrangement, a uniform retarding force is applied to an aircraft so that impact loads are reduced, occupant discomfort is minimized, and maximum braking efficiency for a given runout distance, or number of reel turns, is achieved. It is common to operate the energy absorber by rotation of the reels. In such arrangements, reel rotation slows down as an aircraft decelerates; and, since retarding force is a function of reel r.p.m., it is therefore necessary to provide some programming device which will maintain a desired constant retarding force as rotation of the reel slows down. One type of programmed braking device is disclosed in U.S. Pat. 3,142,458 to Byrne et al. In such apparatus, a cam is operated by rotation of the reel to progressively close a hydraulic valve so that a retarding force will remain substantially constant even though reel rotation is slowing down. In rotary hydraulic energy absorbers, it is also desirable to produce a substantially constant retarding torque with decreasing r.p.m. The retarding torque produced by a rotary hydraulic energy absorber is equal to a K factor times the square of the r.p.m. Therefore, the retarding torque falls off very rapidly as the r.p.m. decreases. Attempting to maintain this torque constant simply by progressively opening a valve to provide more liquid to the absorber is very difficult. One way of maintaining a substantially constant torque would be to change the K factor as reel r.p.m. decreases. In some prior arrangements, it has been proposed to use a rotary hydraulic energy absorber having adjustable rotor vanes or stator pockets. In such arrangements, the vanes or pockets are adjusted prior to arrestment of an aircraft and remain in the adjusted position throughout the entire arrestment. While this type of arrangement compensates for aircraft of different weights and landing speeds, it does not solve the problem of how to maintain a substantially constant retarding torque as reel r.p.m. decreases.

It would be desirable to have a rotary hydraulic energy absorber in which the K factor progressively increases during arrestment of an aircraft so that the retarding force applied to a reel would remain substantially constant.

SUMMARY OF THE INVENTION

In accordance with the present invention, a rotary hydraulic energy absorber is provided with a rotor having vanes, and a stator having pockets. Either the rotor vanes or the stator pockets are progressively adjusted throughout arresting of an aircraft so that the retarding torque produced by the energy absorber remains substantially constant even though r.p.m. is decreasing. In accordance with one arrangement, the rotor vanes are rotatably mounted on axes which extend radially from the axis of rotation of the rotor. An adjusting device is connected with the vanes for rotating the vanes during arrestment of an aircraft. A mechanism operated by rotation of the energy absorber is connected with the adjustment means for progressively shifting the vanes during arrestment of an aircraft so that retarding torque remains substantially constant even though r.p.m. decreases.

In accordance with another arrangement, it is possible to progressively adjust the stator pockets during arrestment of an aircraft in order to maintain a substantially constant retarding torque. In a preferred arrangement, the vanes are progressively adjusted during arrestment of an aircraft and the pockets are adjustable to a predetermined fixed position which corresponds to a desired weight setting for the weight of the particular aircraft to be arrested. With such an arrangement, the retarding torque produced by the energy absorber will remain substantially constant during arrestment of an aircraft and the torque produced will have a maximum value corresponding with the weight of the aircraft being arrested.

It is a principal object of the present invention to provide a rotary hydraulic energy absorber which will provide a substantially constant retarding torque with decreasing r.p.m.

It is also an object of the present invention to provide a rotary hydraulic energy absorber with rotor vanes or stator pockets which are progressively adjusted during arrestment of an aircraft to maintain a substantially constant retarding torque.

It is a further object of the present invention to provide a rotary hydraulic energy absorber with progressively adjustable rotor vanes in order to maintain a substantially constant retarding torque with decreasing r.p.m. and to provide such an absorber with adjustable stator pockets which may be preset in accordance with the weight of an aircraft to be arrested.

It is a further object of the present invention to provide such a rotary hydraulic energy absorber with an operating device for automatically moving the rotor vanes to a position of substantially maximum retarding torque upon failure of the adjustment means.

BRIEF DESCRIPTION OF THE DRAWING

The invention may take physical form in certain parts and arrangements of parts, a preferred embodiment of which will be described in detail in this specification and illustrated in the accompanying drawings which form a part hereof.

FIG. 4 is an enlarged, elevational cross-sectional view looking in the direction of arrows 4—4 of FIG. 2;

FIG. 5 is a cross-sectional view of the improved energy absorber of the present invention; and FIG. 6 is an elevational view similar to FIG. 4 and showing a modified adjusting device constructed in accordance with the present invention.

DESCRIPTION OF THE PREFERRED EMBODIMENT

Figure 1:
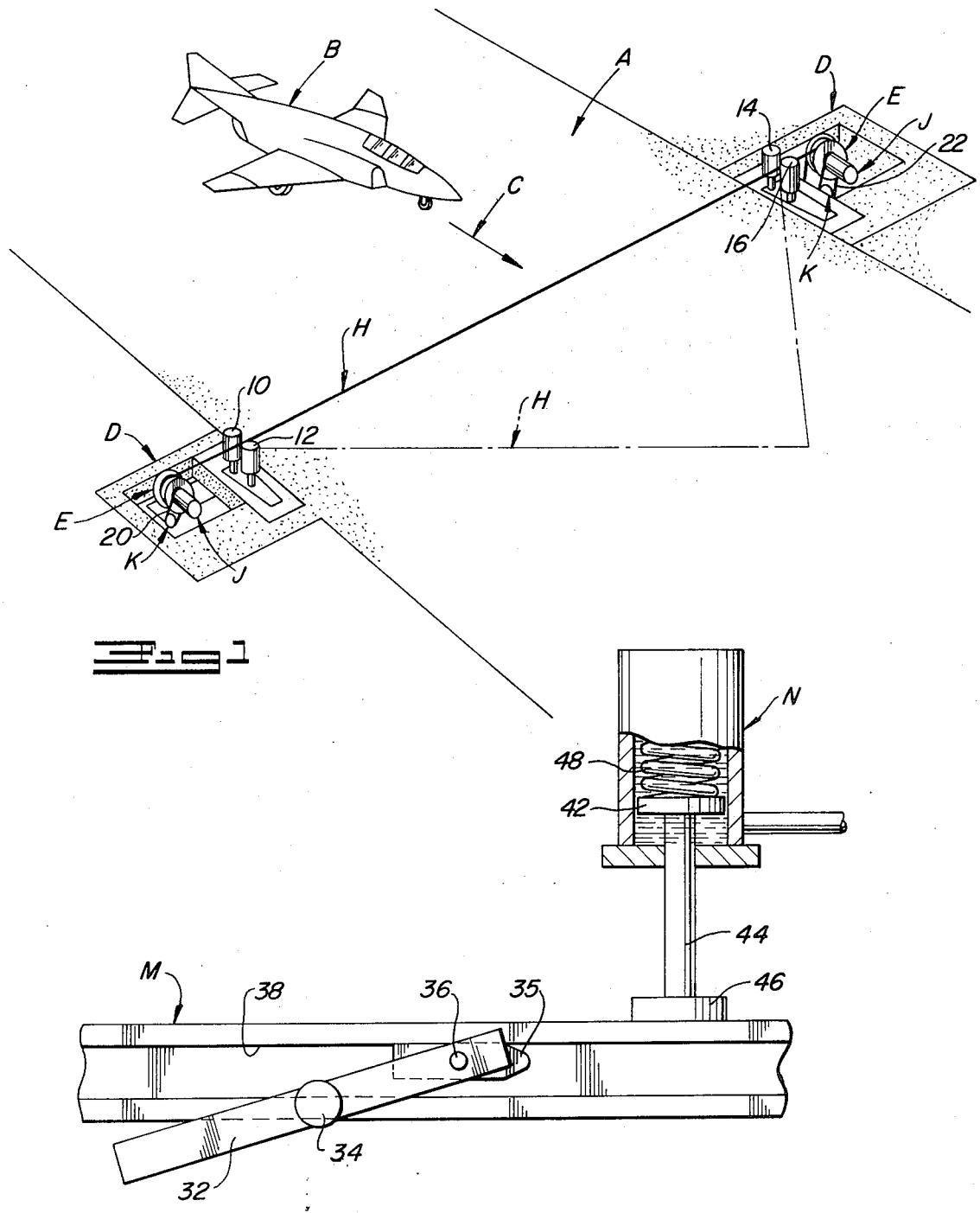
FIG. 1 is a diagrammatic illustration of an aircraft arresting apparatus having the present invention incorporated therein.

Referring now to the drawing wherein the showings are for purposes of illustrating the preferred embodiment of the invention only and not for purposes of limiting same, FIG. 1 shows an aircraft runway A on which an aircraft B is adapted to land and move in the direction of arrow C. Installed on opposite sides of runway A are energy absorbers D which include rotatable reels E on which an elongated flexible cable H is coiled. Cable H extends from reels E transversely of runway A through sheaves 10, 12, 14 and 16. An aircraft B landing on runway A engages cable H to uncoil cable H from reels E. Cable H then moves progressively down runway A to a plurality of shadow line positions as indicated in FIG. 1. Uncoiling of cable H from reels E causes reels E to rotate and such rotation is retarded by energy absorbers J connected with reels E. Energy absorbers J retard rotation of reels E to place cable H in tension and decelerate aircraft B. Suitable rewind motors K may be provided for reversely driving reels E through chains 20 and 22 for coiling cable H back onto reels E following arrestment of an aircraft. Such recoiling arrangements are described in the aforementioned patent to Byrne et al.

Figure 2:
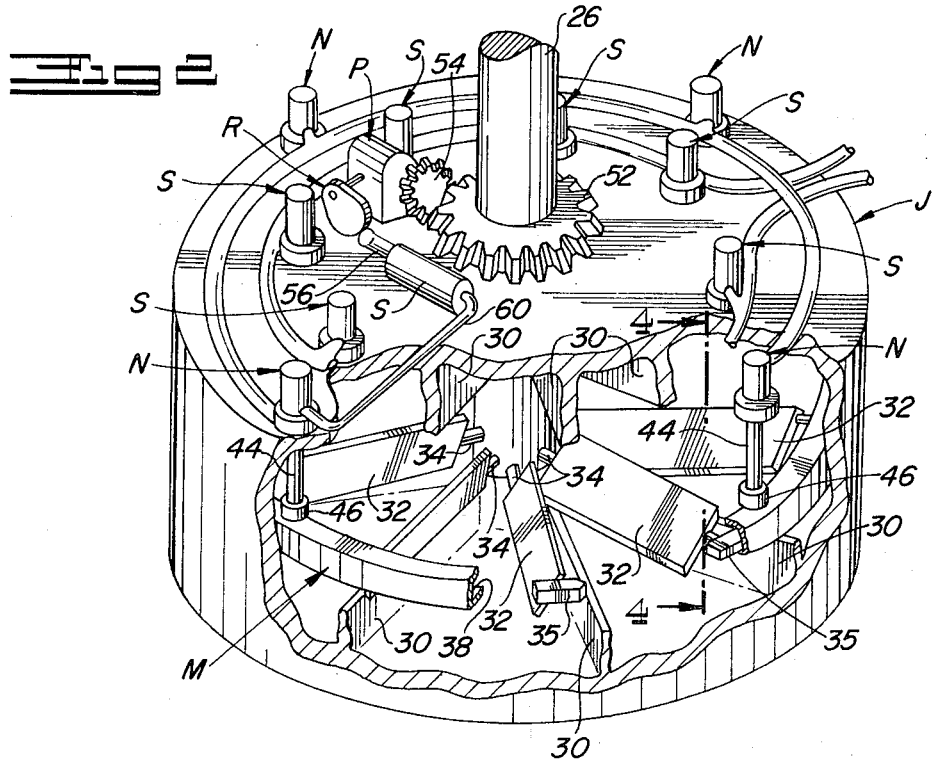
FIG. 2 is a perspective view of the improved energy absorber of the present invention and with portions removed and cut away for clarity of illustration.
Figure 3:
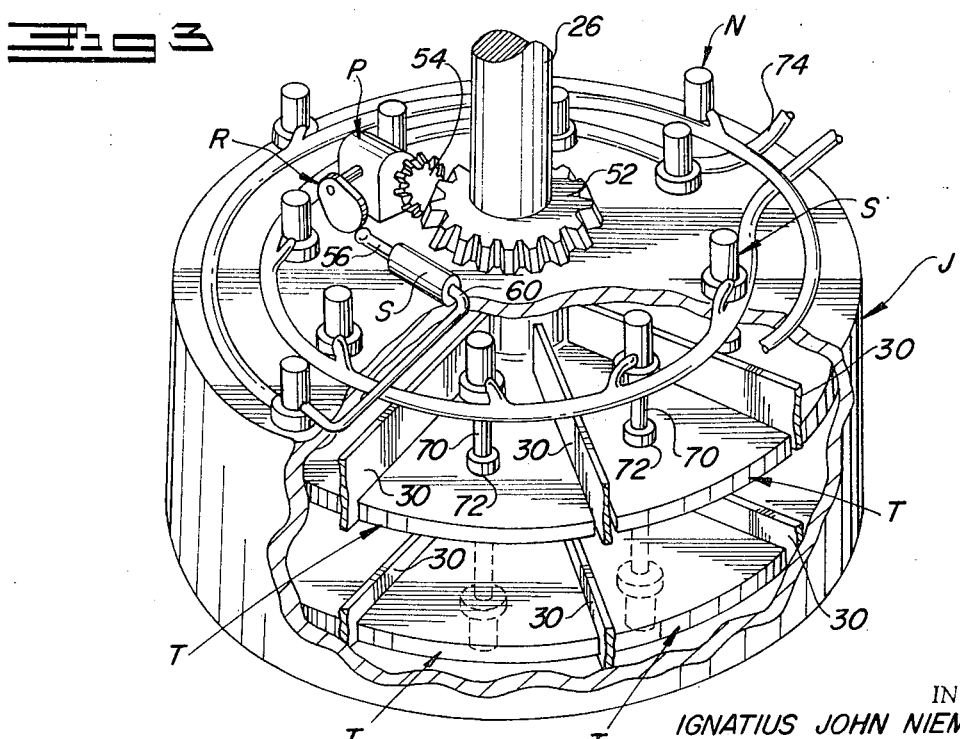
FIG. 3 is a perspective view of a rotary hydraulic energy absorber having the improvement of the present invention incorporated therein and with portions removed and cut away for clarity of illustration.

In accordance with the present invention, energy absorber J defines a housing in which liquid may be received. With reference to FIG. 2, a shaft 26 extends into the interior of housing J and is rotatably journaled for rotation relative to housing J. Shaft 26 is connected with reels E so that rotation of reels E causes rotation of shaft 26 with respect to housing J which is fixed against rotation. Housing J includes vanes 30 which extend radially from the rotational axis of shaft 26. The spaces between adjacent vanes 30 define pockets which are stator pockets of a rotary hydraulic energy absorber. That portion of shaft 26 which is positioned internally of housing J defines a rotor to which a plurality of equi-angularly spaced vanes 32 are secured. In a preferred arrangement, vanes 32 are rotatably attached to shafts 34, which are fixed to shaft 26, and extend radially outward therefrom in equi-angular spacing arrangement. Rotation of shaft 26 and vanes 32 creates turbulence and a shearing interaction of liquid between vanes 32 and the stator pockets defined by stator vanes 30. This interaction of rotor vanes 32 and the stator packets provides a retarding torque to shaft 26.

Rotor vanes 32 have outer end portions with follower bearing elements 35 secured thereto as by pin 36 of FIG. 4. Pin 36 extends outwardly from the outer end portion of vanes 32 substantially parallel but eccentric to shafts 34 which are located substantially centrally across the width of each vane 32. Followers 35 are rotatably attached to pins 36.

In order to adjust the position of rotor vanes 32, a circular ring member M is positioned within housing J outwardly of the outer end portions of rotor vanes 32. Ring member M is positioned within housing J for movement parallel to the rotational axis of shaft 26. Ring member M includes an inwardly facing guide channel 38 which slidably receives followers 35. A plurality of hydraulic cylinders N are fixed in equi-angularly spaced relationship to an outer sidewall of housing J. Hydraulic cylinders N include pistons 42 attached to rods 44 which are welded or bolted to ring member M by connectors 46. Coil springs 48 positioned within hydraulic cylinders N work against the upper faces of pistons 42 and normally bias rods 44 to their fully extended position with respect to cylinders N. With rods 44 fully extended, ring M is positioned substantially in line with shafts 34 so that the flat faces of rotor vanes 32 lies substantially in a plane which is parallel to ring M. In this position, rotor vanes 34 provide a minimum of interaction with the stator pockets defined by stator vanes 30.

In one arrangement for adjusting the position of rotor vanes 32, a bevel gear 52 is fixed for rotation with shaft 26. Bevel gear 62 is drivingly connected with another bevel gear 54 connected with a gear reduction unit P having a power takeoff for rotating cam R. Gear reduction device P is arranged so that cam R is rotated one revolution during each arrestment cycle. For example, in an arrangement where reels E rotate 100 revolutions before cable H is completely uncoiled therefrom, cam R will be rotated one revolution during the 100 revolutions of reels E. Cam R cooperates with rod 56 extending from hydraulic master cylinder S. Rod 56 is connected with a piston internally of cylinder S and a coil spring is arranged internally of cylinder S to normally bias rod 56 to its fully extended position. As cam R is rotated during arrestment of an aircraft, rod 45 is moved inwardly into cylinder S and transmits hydraulic pressure through line 60 which is connected with each of cylinders N. Line 60 is connected with each cylinder N beneath pistons 42 so that pressure in line 60 will move pistons 42 upwardly against spring force in each of cylinders N. This movement of pistons 42 causes rods 44 to retract into cylinders N and pulls ring member M axially upward to rotate rotor vanes 32 about their mounting shafts 34. Cam R is contoured to progressively increase the pressure in line 60 during arrestment of an aircraft so that ring member M is progressively shifted during arrestment of an aircraft. Shifting movement of ring member M rotates rotor vanes 32 about their shafts 34 so that their flat faces begin moving toward a position in which they would eventually lie in planes which extend through the rotational axis of shaft 26. This progressive shifting movement of rotor vanes 32 progressively increases the retarding torque provided by interaction of rotor vanes 32 and the stator pockets defined by stator vanes 30. With this arrangement, the shallow angle of rotor vanes 32 provides a certain retarding torque when reels E are rotating at their highest rotational rate at initial engagement of aircraft B with cable H. As reels E slow down due to the retarding torque produced by the rotary hydraulic energy absorber, the angle of vanes 32 progressively changes in a programmed manner to maintain the retarding torque substantially constant even though the angular velocity is decreasing. Therefore, an aircraft is very smoothly braked to a halt.

In accordance with another aspect of the invention, another plurality of equi-angularly spaced hydraulic cylinders S are mounted on housing J. Cylinders S are centrally located between each adjacent pair of stator vanes 30 so that there is one hydraulic cylinder S for each stator pocket. Positioned within each stator pocket is a baffle plate T. Cylinders S are the same type as described with reference to numeral N in FIG. 4 and include rods 70 which are welded or bolted to baffles T by connectors 72. All of cylinders S are interconnected by a hydraulic line 74 which is conected to a suitable source of hydraulic pressure through a valve 76. Operation of valve 76 will move baffles T to any desired position within the pockets defined between stator vanes 30. In this manner, the depth of the pockets may be preset by applying a predetermined pressure to cylinders S and positioning baffles T in a desired location for a predetermined depth of pocket. With such an adjustment, the rotary hydraulic absorber of the present invention may be preset for a predetermined aircraft weight. For example, in the absence of any baffles T, the progressively adjustable rotor vanes 32 will provide a maximum retarding torque by cooperation with very deep stator pockets. By adjusting baffles T to a predetermined position, the depth of the stator pockets is reduced and the maximum retarding torque which may be produced is decreased. This insures that aircrafts of all weights may be efficiently arrested over a maximum runout distance with minimum loading, and very light aircraft will not be decelerated at an extremely high rate. In accordance with another aspect of the invention, it is possible to progressively adjust baffles T in the same manner as described with respect to rotor vanes 32. Thus, it is possible to progressively adjust either rotor vanes 32 or stator pocket baffles T, or both rotor vanes 32 and stator pocket baffles T. Cylinders S are provided on both sides of housing J so that the pockets on both sides of rotor vanes 32 may be provided with adjustable baffles T. The interior of housing J may be connected by suitable pipes 78 and 80 which are connected to a suitable liquid reservoir for circulating water through housing J. Reel E may be connected through a suitable clutch to rewind motor K by chain 20 for recoiling cable H on reels E. In accordance with one arrangement, a one-way clutch 82 is provided between reel E and shaft 26 so that rotary hydraulic energy absorber J is rotated only when cable H is uncoiling therefrom. When reel E is rotating in a reverse direction by motor K and chain 20 to recoil cable H thereon, one-way clutch 82 slips so that no torque is transmitted to rotary hydraulic energy absorber J by shaft 26.

In the arrangement described with reference to FIG. 2, it will be recognized that cylinders N automatically bias rotor vanes 32 and ring member M to a position of minimum torque once an aircraft has been brought to a halt and cam R has completed an entire revolution. Therefore, it is not necessary to reset the device prior to making another arrestment. In accordance with another arrangement, it is possible to provide a one-way slip clutch in gear box P so that cam R can be driven in only one direction. Therefore, omission of clutch 82 is possible because rotor vanes 32 are automatically moved to a position of minimum torque following an arrestment and do not interfere with rewind of cable H on reels E.

In accordance with another aspect of the present invention, the adjusting mechanism may be arranged so that rotor vanes 32 will automatically assume a position of maximum retarding torque should there be any failure in the hydraulic adjusting mechanism. One such arrangement is shown in FIG. 6 wherein each hydraulic cylinder N is replaced by a hydraulic cylinder 86 which includes a piston 88 connected with a rod 90. Rod 90 is suitably welded or bolted to ring member M by connector 92. A coil spring 94 positioned beneath the bottom face of piston 88 and around rod 90 normally biases piston 88 upward. This in turn normally causes ring member M to move axially upward to bring rotor vanes 32 into their position of maximum retarding torque. A master cylinder 96 is provided with a piston 98 and rod 102. Rod 102 is acted upon by cam R in the same manner as described with reference to FIG. 2. A coil spring 104 normally biases piston 98 to a position in which rod 102 is fully extended. A hydraulic line 106 connects the rod end of piston 98 with the upper end of hydraulic cylinder 86. Spring 104 in master cylinder 96 is more powerful than all of the springs 94 in cylinders 86 so that hydraulic pressure supplied through line 106 normally holds rods 90 fully extended against the force of springs 94. Movement of rod 102 inwardly by the interaction of cam R during arrestment of an aircraft compresses spring 104 to relieve hydraulic pressure in line 106 and allows springs 94 to retract rods 90 within cylinders 86. This progressively moves rotor vanes 32 to a position of maximum retarding torque so that the retarding torque is maintained substantially constant even though angular velocity is decreasing during an arrestment. In case of pressure failure in the system, it will be readily apparent that leakage of hydraulic pressure will automatically cause springs 94 to move rods 90 inwardly of cylinders 86 and ring member M will automatically be moved to bring rotor vanes 32 into their maximum braking position.

In the aforementioned patent to Byrne et al., a flat tape is wound layer-by-layer on a reel. Uncoiling of such a tape from a reel provides an automatic arrangement for maintaining a substantially constant reel velocity during arrestment of an aircraft. While the rotary hydraulic energy absorber of the present invention is very useful with such a device, it is also very useful with a cable type of reel. In a cable reel, deceleration of the aircraft decreases the rate at which the cable is uncoiling from the reel and this reduces reel angular velocity. With the present invention, a progressively decreasing angular velocity for the reel still maintains a substantially constant braking force to the aircraft because of the programmed adjustment of the rotor vanes which progressively increase the capable retarding torque at a rate which is proportional to the deceleration rate of the angular velocity of the reel. The adjustment of rotor vanes 32 in accordance with the present invention progressively increases the effective width of the vanes. The retarding torque provided by a rotary hydraulic type of energy absorber is proportional to the vane width to the 1.2 power. Therefore, it is possible to program the adjusted progressive movement of rotor vanes 32 so that they gradually move to an effective width of increasing retarding torque at a rate which maintaine a substantially constant retarding torque with decreasing angular velocity. In accordance with another arrangement, it is possible to make rod 56 of master cylinder S telescopically adjustable so that some hydraulic pressure is provided from cylinder S to cylinder N prior to an arrestment. With such an arrangement, it is possible to start an arrestment with rotor vanes 32 positioned other than at a substantially zero retarding torque position in order to increase the retarding torque available over a major portion of an aircraft arrestment. It will be recognized that cam R may be arranged to rotate one revolution for something like 30 revolutions of reels E. With such an arrangement, a substantially constant braking torque is supplied to an aircraft over a major portion of its arrestment cycle and rotor vanes 32 are in their position of maximum braking torque well before an aircraft is brought to a complete stop. However, the aircraft will have slowed to such an extent that it may be brought to a stop very rapidly by its own brakes or by a supplemental friction brake provided for reels E.

Those skilled in the art will recognize that it is possible to progressively adjust only certain ones of rotor vanes 32. For example, the energy absorber may have eight of vanes 32 and only four, or every other one, may be connected with adjustment ring member M. The other four vanes would be fixed in their position of maximum braking action. In such arrangements, it is desirable that the adjustable vanes be equi-distantly spaced around their hub so that the arrangement is symmetrical and provides a balanced device. It will also be recognized that the present invention is useful with absorbers mounted on either vertical or horizontal rotational axes.

While the invention has been described with reference to a preferred embodiment, it is obvious that modifications and alterations will occur to others upon the reading and understanding of this specification.

Having thus described our invention, we claim:

1. In an aircraft arresting device including rotatable reel means having elongated payout means coiled thereon, said payout means being placed in tension and said reel being rotated to uncoil said payout means therefrom during arrestment of an aircraft, hydraulic energy absorber means for retarding rotation of said reel, said absorber means including housing means for receiving liquid, said absorber means having cooperating braking structures cooperating with liquid in said housing and with one another to provide retarding braking force to said reel, said braking structures including rotor means having vanes defining first element means and stator means having pockets defining second element means, automatic adjustment means operable independent of the interaction force between said braking structures and liquid in said housing for automatically adjusting at least one of said element means to progressively increase the braking action provided by cooperation of said braking structures in the presence of liquid as said reel rotates during arrestment of an aircraft, said rotor including a hub and said vanes extending substantially radially from said hub along substantially radial vane axes, said vanes defining said adjustable element means, said vanes being rotationally adjustable about said radial vane axes by said automatic adjustment means, the improvement comprising; said vanes having outer end portions and said automatic adjustment means including positioning means connected with said outer end portions of said vanes, said positioning means being progressively moved by rotation of said reel to progressively move said vanes to greater braking action angles during arrestment of an aircraft.

2. The device of claim 1 and further including automatic repositioning means for moving said vanes to a position of minimum braking action following arrestment of an aircraft.

3. The device of claim 1 and further including operating means for automatically moving said vanes to a position of substantially maximum braking action upon failure of said automatic adjustment means.

4. The device of claim 1 wherein said positioning means comprises ring means movable axially of said reel means and said outer end portions of said vanes have follower means thereon positioned radially of said vane axes, said follower means being cooperatively engaged with said ring means.

References Cited
UNITED STATES PATENTS

| | | | |
|---|---|---|---|
| 3,140,761 | 7/1964 | Doolittle | 244—110 AX |
| 3,259,213 | 7/1966 | Daniels et al. | 244—110 AX |
| 2,077,080 | 4/1937 | Tolman | 188—90 |
| 3,168,939 | 2/1965 | Haber | 244—110 AX |

MILTON BUCHLER, Primary Examiner

P. E. SAUBERER, Assistant Examiner

U.S. Cl. X.R.

188—90 A